(12) United States Patent
Shikama

(10) Patent No.: US 11,433,462 B2
(45) Date of Patent: Sep. 6, 2022

(54) DRILLING TOOL

(71) Applicant: TUNGALOY CORPORATION, Fukushima (JP)

(72) Inventor: Hiroya Shikama, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/109,900

(22) Filed: Dec. 2, 2020

(65) Prior Publication Data

US 2021/0178493 A1 Jun. 17, 2021

(30) Foreign Application Priority Data

Dec. 12, 2019 (JP) .............................. JP2019-224379

(51) Int. Cl.
 *B23B 51/06* (2006.01)
 *B23B 27/16* (2006.01)
(52) U.S. Cl.
 CPC ............ *B23B 51/06* (2013.01); *B23B 51/063* (2022.01); *B23B 27/16* (2013.01)
(58) Field of Classification Search
 CPC ..... B23B 51/06; B23B 27/16; B23B 2270/30; B23B 2250/12; B23B 51/0486; B23B 51/0493
 See application file for complete search history.

(56) References Cited

U.S. PATENT DOCUMENTS

| 3,094,016 A | * | 6/1963 | Werner ............... B23B 51/0493 408/153 |
| 3,816,018 A | * | 6/1974 | Hlocky ................... B23B 51/06 408/59 |
| 5,964,553 A | | 10/1999 | Blomberg et al. |
| 6,019,553 A | * | 2/2000 | Yakamavich, Jr. .......... B23B 51/0486 408/224 |
| 6,030,155 A | * | 2/2000 | Scheer .................... B23P 15/32 408/230 |
| 7,572,088 B2 | * | 8/2009 | Biscay ................. B23Q 11/006 408/225 |
| 2005/0025594 A1 | | 2/2005 | Lindblom |
| 2006/0045640 A1 | * | 3/2006 | Hessman ............. B23B 51/0493 408/81 |
| 2006/0222470 A1 | * | 10/2006 | Tchorny .................. B23B 51/06 408/224 |
| 2007/0154715 A1 | | 7/2007 | Annanolli et al. |

(Continued)

FOREIGN PATENT DOCUMENTS

| JP | H02-065907 A | 3/1990 |
| JP | 2010-012523 A | 1/2010 |

(Continued)

*Primary Examiner* — Eric A. Gates
*Assistant Examiner* — Paul M Janeski
(74) *Attorney, Agent, or Firm* — Studebaker & Brackett PC

(57) ABSTRACT

A drilling tool with improved structure to improve chips discharging performance. The drilling tool comprises a cutting insert 60 having a cutting edge 62 at the front end portion and a main body 10 mounted with the cutting insert 60, further, the drilling tool comprises a hollow discharge channel 12 formed inside the main body 10, and the discharge channel 12 has a curved surface 14 for guiding the chips S in a direction towards the base end portion opposite to the front end portion.

9 Claims, 15 Drawing Sheets

(56) References Cited

U.S. PATENT DOCUMENTS

| | | | |
|---|---|---|---|
| 2009/0003948 A1* | 1/2009 | Lutz | B23B 29/03 |
| | | | 408/199 |
| 2010/0003097 A1 | 1/2010 | Kitsukawa | |
| 2010/0040425 A1* | 2/2010 | Nomura | B23B 51/0493 |
| | | | 408/83 |
| 2010/0104385 A1* | 4/2010 | Nomura | B23B 51/0493 |
| | | | 408/83 |
| 2010/0158623 A1 | 6/2010 | Danielsson | |
| 2015/0328696 A1* | 11/2015 | Wang | B23B 51/06 |
| | | | 408/57 |
| 2017/0080501 A1 | 3/2017 | Best et al. | |

FOREIGN PATENT DOCUMENTS

| | | |
|---|---|---|
| JP | 2010-105096 A | 5/2010 |
| JP | 2010-532278 A | 10/2010 |
| JP | 2013-103288 A | 5/2013 |
| WO | 2001/098008 A1 | 12/2001 |
| WO | 2019/087656 A1 | 5/2019 |

* cited by examiner

DRILLING TOOL

CROSS-REFERENCES TO RELATED APPLICATIONS

This application relates to and claims priority from Japanese Patent Application No. 2019-224379 on (Dec. 12, 2019), the entire disclosure of which is incorporated herein by reference.

BACKGROUND OF THE INVENTION

Field of the Invention

The disclosure relates to a drilling tool.

Description of Related Art

Tools for drilling processing conventionally use an indexable drill or the like (for example, WO 2001/98008) which provides a helical groove on a side surface of the main body to allow the chip to be discharged out via the hole.

In addition, tools for deep hole drilling process are used in so-called BTA (Boring & Trepanning Association) method, wherein the cutting oil is fed from the outside and the chip is discharged from the inside. Such method usually utilizes, for example, a special tool or apparatus having the following structure: a drill head is screwed into a drill tube, and cutting oil, which is fed between the drill tube and the hole to be processed to the cutter head, is discharged out of the drill tube together with the chip. Such tool or apparatus is designed to have large quantity of cutting oil to allow the chip to be discharged out of the tube. It utilizes cylindrical tube shape without the need of chip pocket, thereby easily obtaining high rigidity. Furthermore, compared with the gun drill machine, it has improved processing performance.

SUMMARY

However, the tool or apparatus according to the BTA method as mentioned above has special complicated structure with high cost. In addition, general drilling tools or equipment do not provide a structure which allows the cutting to be performed simultaneously with the feeding (supplying) of a large quantity of cutting oil. Thus, they can hardly efficiently discharge chips by utilizing the cutting oil, as in the BTA method, simultaneously when the cutting is performed. Furthermore, no concept or technique has been found to efficiently discharge chips by utilizing the cutting oil simultaneously with the cutting, as in the BTA method, with the use of general drilling tools or equipment.

The purpose of the present disclosure is to provide a drilling tool with improved structure to improve chips discharging performance.

In an embodiment of the disclosure, a drilling tool is provided, characterized in that, the drilling tool comprises: a cutting insert, the cutting insert has a cutting edge at the front end portion; and a main body, the main body is mounted with the cutting insert, the drilling tool comprises a hollow discharge channel formed inside the main body, and the discharge channel has a curved surface for guiding the chip in a direction towards the base end portion opposite to the front end portion.

In the drilling tool according to the above embodiment, a force acting to guide chips in a direction towards the base end portion can be applied by the curved surface of the discharge channel during rotation of the tool, thus improving chips discharging performance. Thus, general drilling tools or equipment can be used, instead of special complicated structure as the BTA method, to efficiently discharge chips simultaneously with the drilling, as in the BTA method. Further, the above mentioned drilling tool, which comprises a hollow discharge channel formed inside the main body, can discharge the fed cutting oil and the chip by the discharge channel simultaneously with the drilling.

In the above mentioned drilling tool, the discharge channel may be formed between the rotation axis of the drilling tool and the outer circumferential surface.

In the above mentioned drilling tool, the curved surface may be an inclined surface configured to apply pushing (accelerating) force on chips in a direction towards the base end portion during rotation of the drilling tool.

In the above mentioned drilling tool, the curved surface may be formed with a helical shape around the rotation axis of the drilling tool.

In the above mentioned drilling tool, the curved surface may have a concaved shape in the cross section perpendicular to the rotation axis.

In the above mentioned drilling tool, a plurality of cutting inserts may be provided, and a number of (same as the number of the cutting insert) discharge channels may be provided, corresponding to respective cutting inserts, and formed to extend from the front end portion to the base end portion and converge with each other during extending.

In the above mentioned drilling tool, a plurality of discharge channels are provided, which are axisymmetrical (rotational symmetrical) about the rotation axis of the drilling tool as a center.

In the above mentioned drilling tool, a supporting member may be further provided. The supporting member may be mounted on the base end portion of the main body to support the main body, and may be provided with a hollow flow channel in communication with the discharge channel of the main body.

In the above mentioned drilling tool, a cutting oil feed (providing or supplying) passage for feeding cutting oil may be further provided.

In the above mentioned drilling tool, the cutting oil feed passage may comprise a cutting oil guiding groove formed on the peripheral surface of the main body.

DETAILED DESCRIPTION

Figure 1:
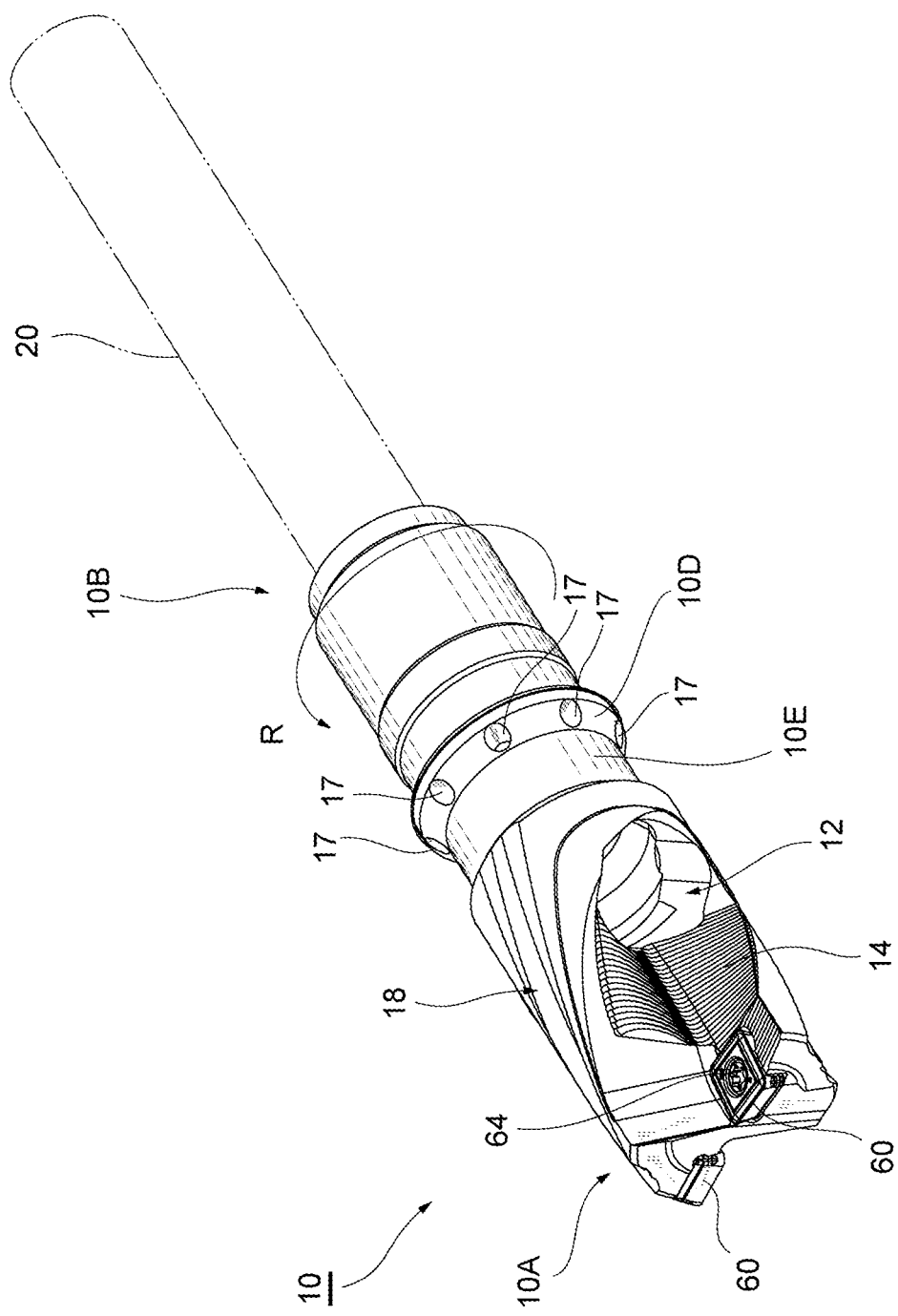
FIG. 1 is a perspective view illustrating a main body, which is one of the components of a drilling tool, according to an embodiment.

Embodiments of the disclosure will be explained below in detail with reference to the drawings. The following embodiments are examples for explaining the present disclosure, and are not intended to limit the present disclosure only to the embodiments.

In the embodiment, a drilling tool 1 includes five members: a main body 10, an inner sleeve member 20, an outer sleeve member 30, a bush 40, and a body cover 50. The drilling tool 1 is configured to rotate about the rotation axis 1C as a center, to drill the work material. Cutting inserts 60 with cutting edges 62 are mounted at a front end portion 1A of the drilling tool 1 (see FIG. 1, etc.). An outer circumferential surface 1D, including both a cylindrical surface and a circular conical surface, is formed between a base end portion 1B and the front end portion 1A.

The five members (the main body 10, the inner sleeve member 20, the outer sleeve member 30, the bush 40, and the body cover 50) shown in the figures, as well as the structure of the drilling tool 1, will be described below.

Figure 5:
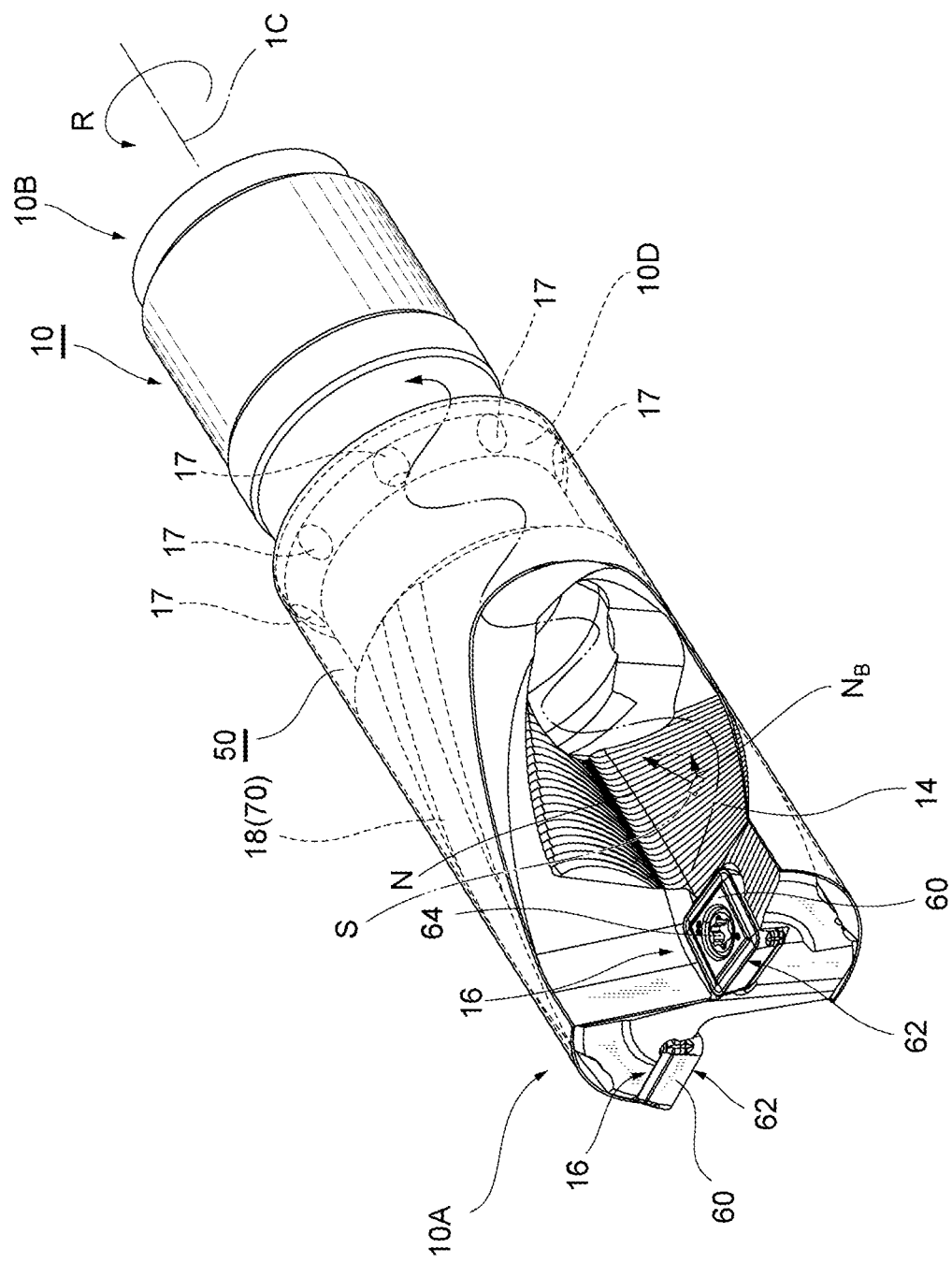
FIG. 5 is a perspective view illustrating a main body and a body cover which are components of a drilling tool.

The main body (the first part) 10 is a bar-shaped component made of metal material and is shaped to extend from a base end 10B to a front end 10A along the rotation axis 1C of the drilling tool 1 (see FIGS. 1 and 5, etc.). As a rotation center of the drilling tool 1, the rotation axis 1C is an imaginary straight line passing through the center of the main body 10. In the embodiment, the main body 10 is arranged with at least a discharge channel 12, a mounting base 16, ejection openings 17, and at least a guiding groove 18.

The discharge channel 12 forms a flow path through which the chip (indicated by symbol S in FIG. 5), which is produced when the work material is drilled by means of the drilling tool 1, can be discharged. In the embodiment, the discharge channel 12 having a hollow structure with a curved surface 14 is formed inside of the main body 10, the curved surface 14 extending rearward from behind the cutting insert 60 to the discharge channel 12. The curved surface 14 serves to guide chips S produced at the front end portion 1A of the drilling tool 1 in a direction towards the base end portion 1B. The number and particular shape of the discharge channel 12 are not particularly limited. However, in the embodiment, a total of two discharge channels 12 are provided, which are helically arranged and are axisymmetrical about the rotation axis 1C in such a manner as to correspond, in a one-to-one manner, to each of the two cutting inserts 60 which are axisymmetrically arranged in the front end portion 1A of the drilling tool 1 (see FIG. 5, etc.).

Figure 7:
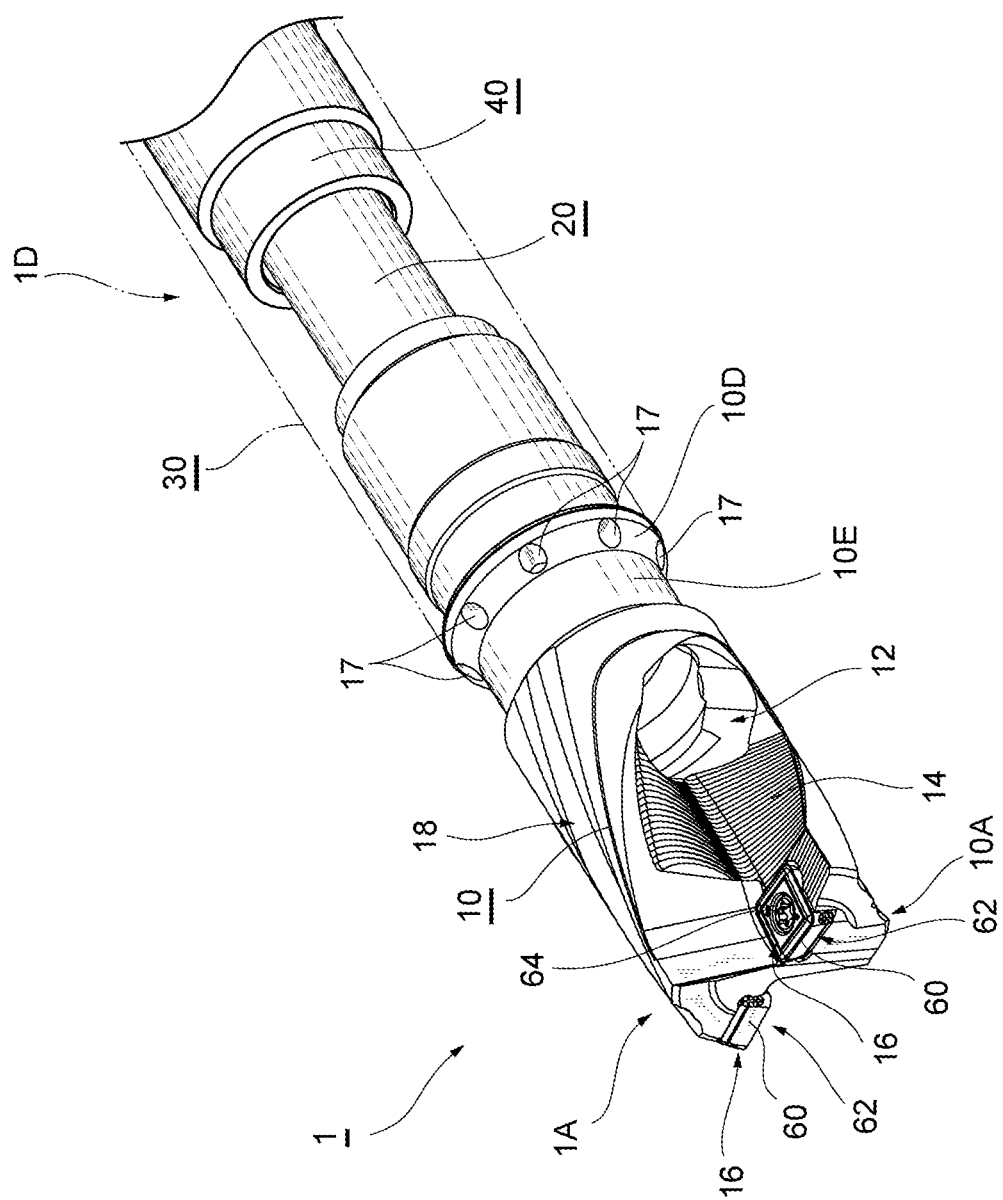
FIG. 7 is a perspective view illustrating a structure near a front end portion of a drilling tool.
Figure 8:
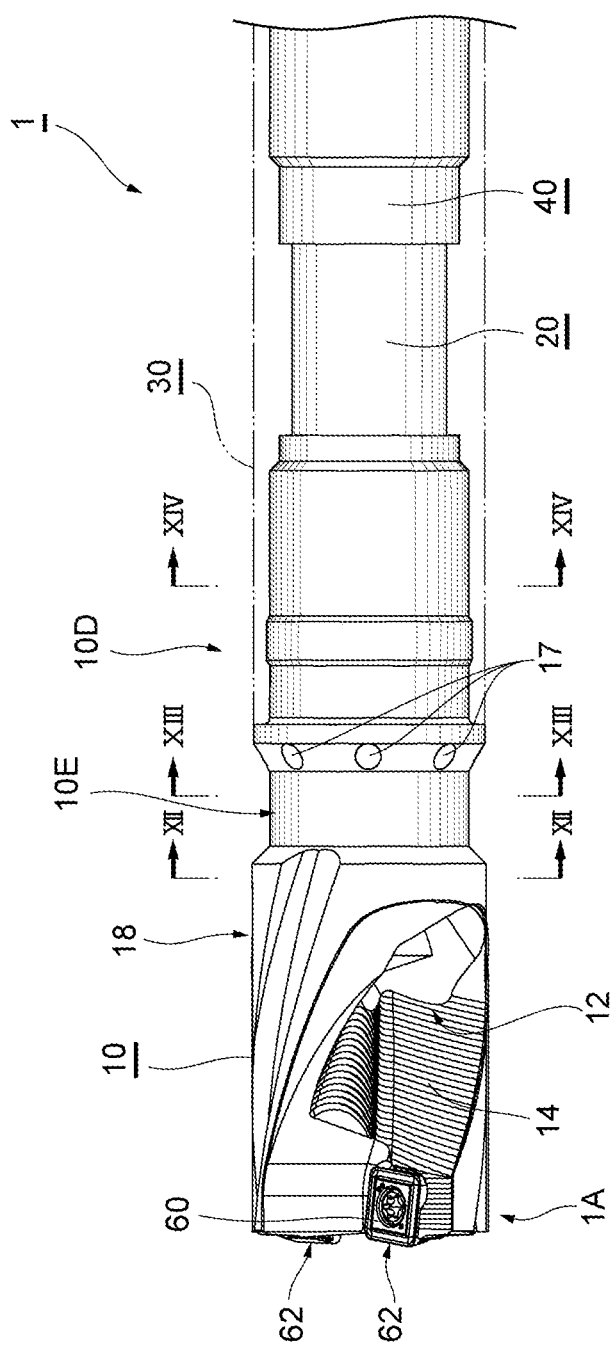
FIG. 8 is a side view illustrating a structure near a front end portion of a drilling tool.
Figure 10:
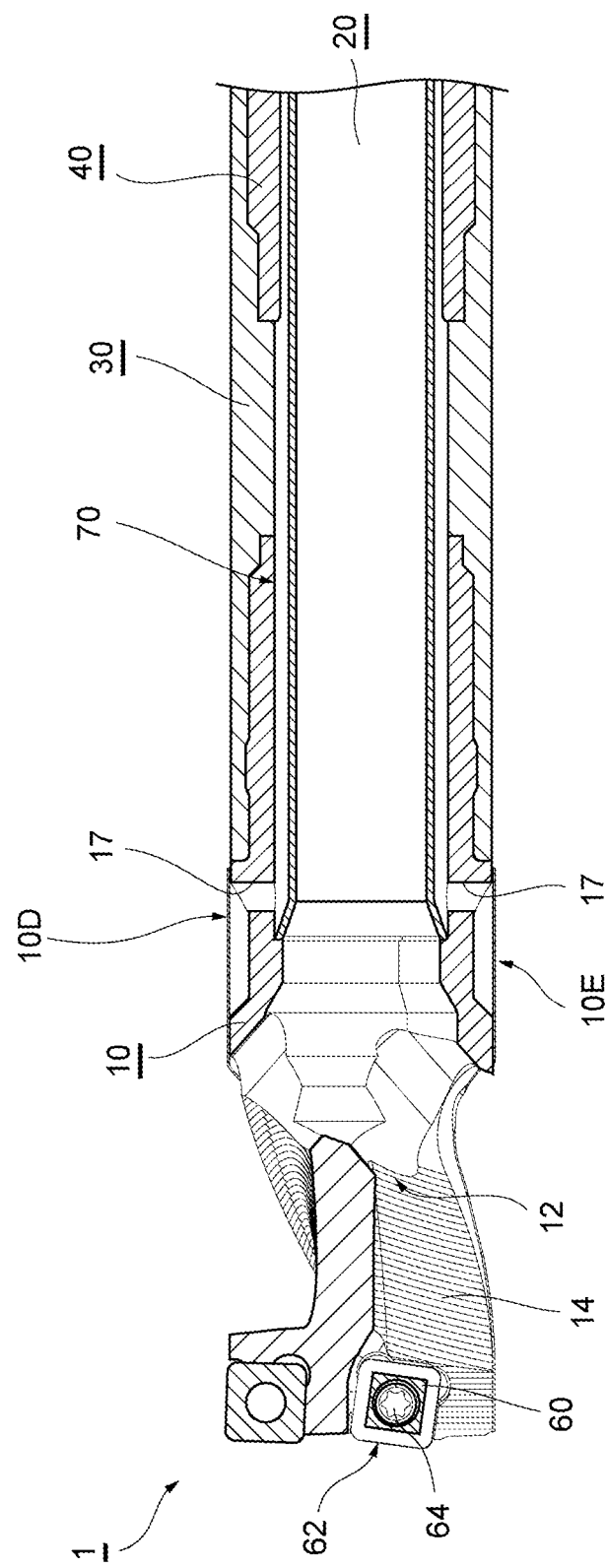
FIG. 10 is a longitudinal cross-sectional view illustrating a structure near a front end portion of a drilling tool.

These discharge channels 12 are formed between the rotation axis 1C and the outer circumferential surface 1D of the drilling tool 1, in such a manner as to enable the chips S to move in a direction towards the base end portion 1B during the rotation for drilling (see FIG. 5, etc.). In the embodiment, for example, the discharge channel 12 is formed as follows. The discharge channel 12 is helical shaped and shaped as right-hand thread, such that it can be rotated, as the drilling tool 1, in a rotating direction (the counterclockwise direction when viewed from the front end portion 1A side, i.e., the direction indicated by symbol R in FIG. 1) to allow the chip S to move to the base end portion 1B side, and the discharge channel 12 is shaped to be axisymmetrical with the rotation axis 10 as the center (see FIGS. 7 and 8, etc.). The pair of discharge channels 12 are formed to extend from the front end 10A to the base end 10B of the main body 10 and converge with each other during extending near the rotation axis 10 (see FIGS. 5 and 10, etc.).

The shape of the curved surface 14, i.e., the surface of the discharge channel 12, is not particularly limited. However, in the embodiment, the curved surface 14 has a concaved shape in the cross section perpendicular to the rotation axis 10 (see FIG. 1, etc.). With respect to the shape of the curved surface 14 in such case, it may have same curvature, or different curvatures varied from one radial (or axial) position to another, or may be appropriately twisted. In any event, it is shaped in such a manner as to generate a component of force in a direction to effectively guide the chips S from the surface of the curved surface 14 towards the base end portion 1B side during rotation.

During drilling processing by means of drilling tool 1, the discharge channel 12 defined by the above-mentioned curved surface (discharge surface) 14 generates the force (a resistance towards a direction perpendicular to the surface) N acting on the chips S from the curved surface 14 which includes a component of force NB towards the base end portion 1B side and the force guiding in a direction towards the base end portion 1B, to improve chips S discharging performance. From this viewpoint, the curved surface 14 of the discharge channel 12 is preferably formed to provide a force which effectively guides the chips S at any position towards the base end portion 1B.

The mounting base 16 is a base portion for mounting the cutting insert 60. In the embodiment, the front end 10A of the main body 10 are arranged with two mounting bases 16 (see FIG. 5, etc.) at positions axisymmetrical about the rotation axis 10, and two cutting inserts 60 are mounted on the two mounting bases 16, respectively. The cutting inserts 60 are mounted at predetermined positions on the mounting bases 16 by mounting screws 64.

Figure 9:
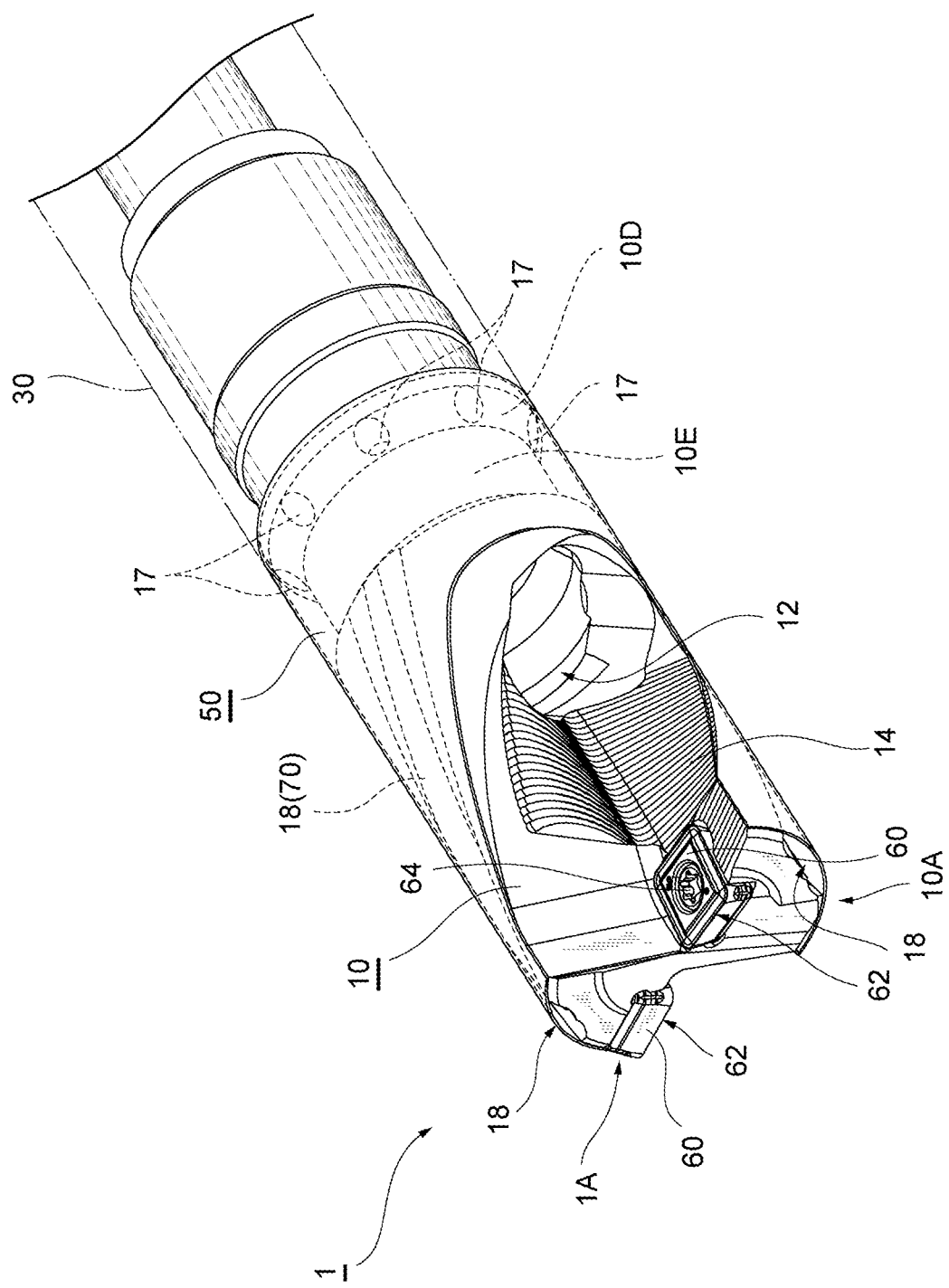
FIG. 9 is a further enlarged perspective view illustrating a structure near a front end portion of a drilling tool.
Figure 13:
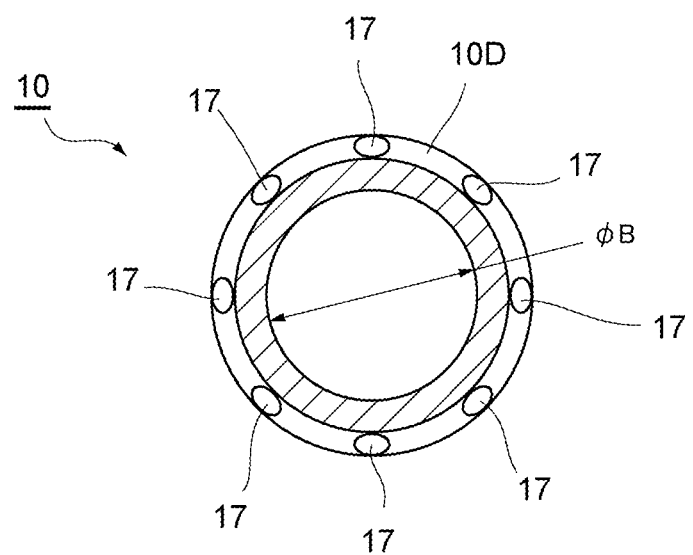
FIG. 13 is a cross-sectional view of a drilling tool taken along line XIII-XIII of FIG. 8.

The ejection openings 17 are openings for ejecting cutting oil (also serving as the coolant) fed from the base end 40B side of the bush 40. In the embodiment, the plurality of radial ejection openings 17 for ejecting cutting oil are disposed in the circumferential direction at an equal interval on the circular conical surface of the cone shape of the outer peripheral surface of the main body 10 (indicated by symbol 10D in FIG. 5, etc.) (see FIGS. 9 and 13, etc.). A cutting oil feed (supply) passage (indicated by symbol 70 in the figures), which is cylindrical, is formed between the main body 10 and the inner sleeve member 20. The cutting oil fed from the cutting oil feed passage 70 and ejected via the ejection openings 17 can flow through the space around the reduced-diameter portion 10E and flow to the guiding grooves 18.

The guiding grooves 18 are grooves for feeding the cutting oil ejected via the ejection openings 17 to the front end portion 1A of the drilling tool 1. In the embodiment, guiding grooves 18, which are helical, are arranged on the outer circumferential surface of the main body 10 (see FIGS. 7, 11 and 12, etc.). In the case that the body cover 50 is mounted outside the main body 10 (see FIG. 5, etc.), the cutting oil feed passage 70 which includes the guiding groove 18 is formed between the body cover 50 and the main body 10. The cutting oil fed from the cutting oil feed passage 70 to front end portion 1A of the drilling tool 1 reverses direction at the bottom of the hole of the work material and then can be discharged out via the discharge channel 12 of the main body 10.

Figure 2:
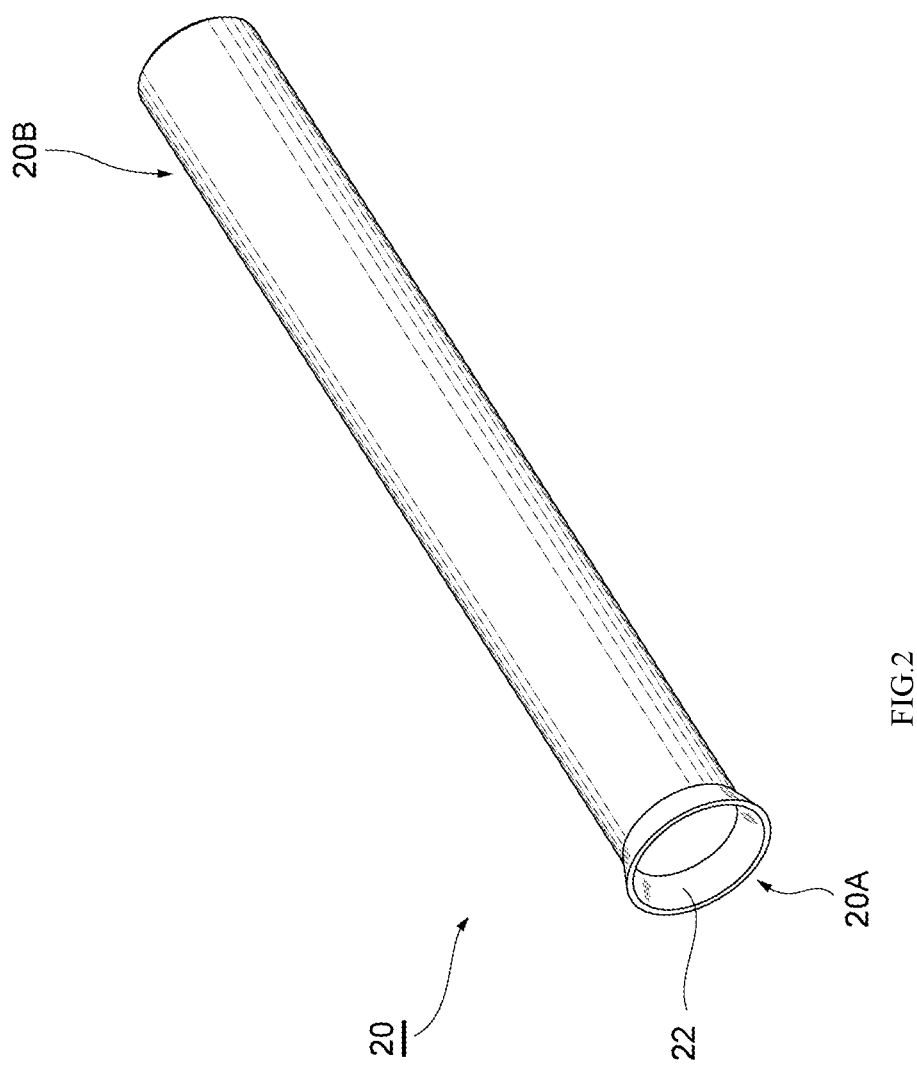
FIG. 2 is a perspective view illustrating an inner sleeve member, which is one of the components of a drilling tool, according to an embodiment.

The inner sleeve member (the second part) 20 is a cylindrical member that mounted on the base end 10B of the main body 10 (see FIGS. 1 and 2, etc.). The front end 20A of the inner sleeve member 20 is formed with a tapering enlarged diameter portion 22 (see FIG. 2, etc.). It should be noted that the symbol 20B indicates the base end of the inner sleeve member 20.

Figure 3:
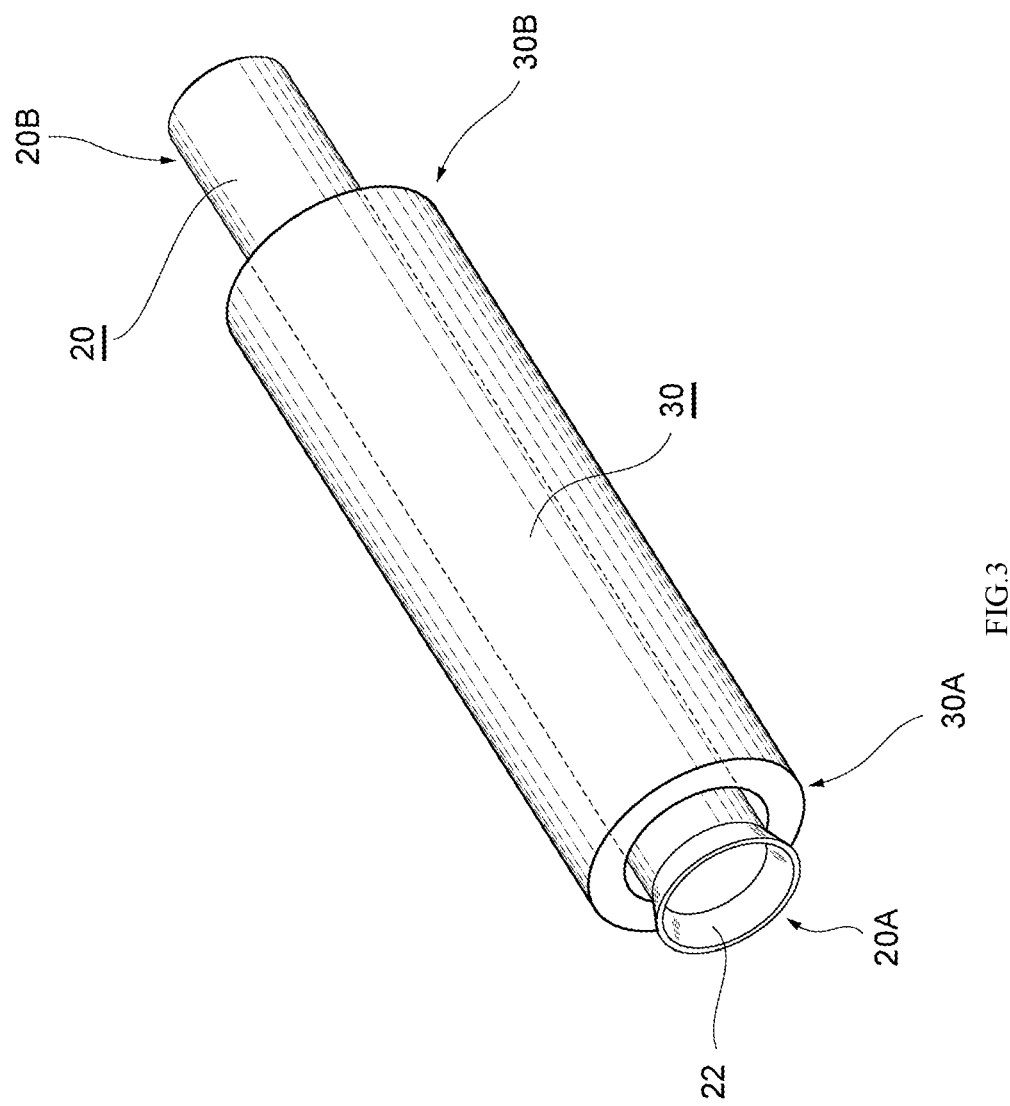
FIG. 3 is a perspective view illustrating an inner sleeve member and an outer sleeve member, which are components of a drilling tool, according to an embodiment.

Compared with the inner sleeve member 20, the outer sleeve member (the third part) 30 has a greater diameter and a shorter length (a shorter axial length). The outer sleeve member (third part) 30 is a cylindrical member that mounted outside the inner sleeve member 20 (see FIG. 3, etc.). A feed passage is formed between the outer sleeve member 30 and the inner sleeve member 20, and the feed passage defines a portion of the cutting oil feed passage 70 and has an annular cross section (see FIG. 15). It should be noted that, the symbol 30A indicates a front end of the outer sleeve member 30, and the symbol 30B indicates a base end of the outer sleeve member 30.

Figure 4:
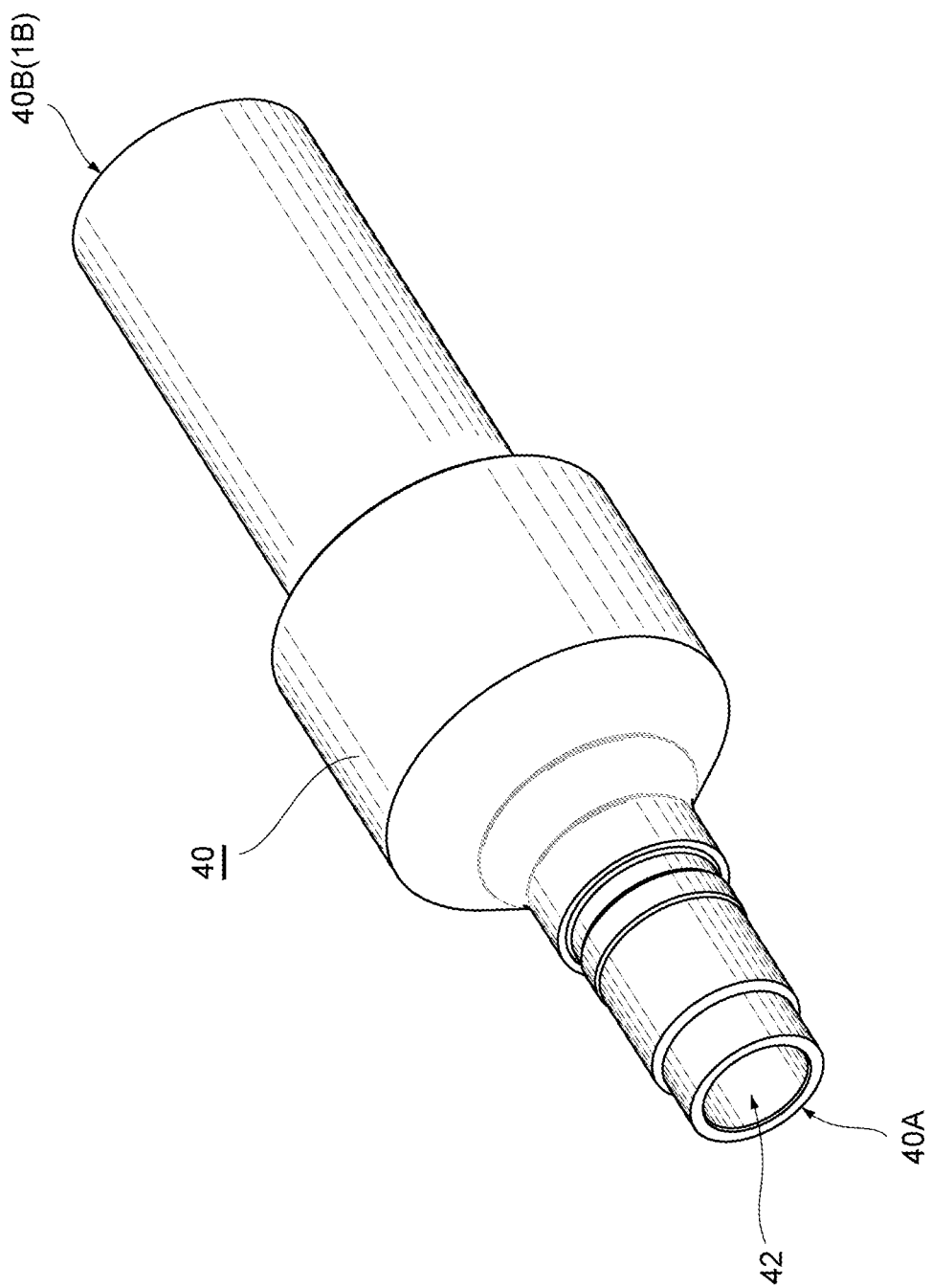
FIG. 4 is a perspective view illustrating a bush, which is one of the components of a drilling tool, according to an embodiment.

The bush (the fourth part) 40 is mounted on the base end 10B side of the main body 10 and functions as a supporting member for supporting the main body 10. The shape and structure of the bush 40 are not particularly limited. However, in the embodiment, the member is designed to have a hollow shape having the hollow flow channel 42 and (see FIG. 4, etc.). The hollow flow channel 42 is formed to communicate with the discharge channel 12 of the main body 10 through the inner sleeve member 20 (see FIG. 15, etc.). It should be noted that the symbol 40A indicates a front end of the bush 40, and the symbol 40B indicates a base end of the bush 40.

The body cover (the fifth part) 50 is a member mounted outside the main body 10. In the embodiment, the body cover 50 covers a portion of the outer peripheral surface of the main body 10 which includes the circular conical surface 10D, and the cutting oil feed passage 70 is formed between the body cover 50 and the outer circumferential surface of the main body 10 (see FIG. 9, etc.).

The steps for assembling the five parts (the main body 10, the inner sleeve member 20, the outer sleeve member 30, the bush 40, the body cover 50) as mentioned above will be described below (see FIG. 6, etc.).

Figure 6:
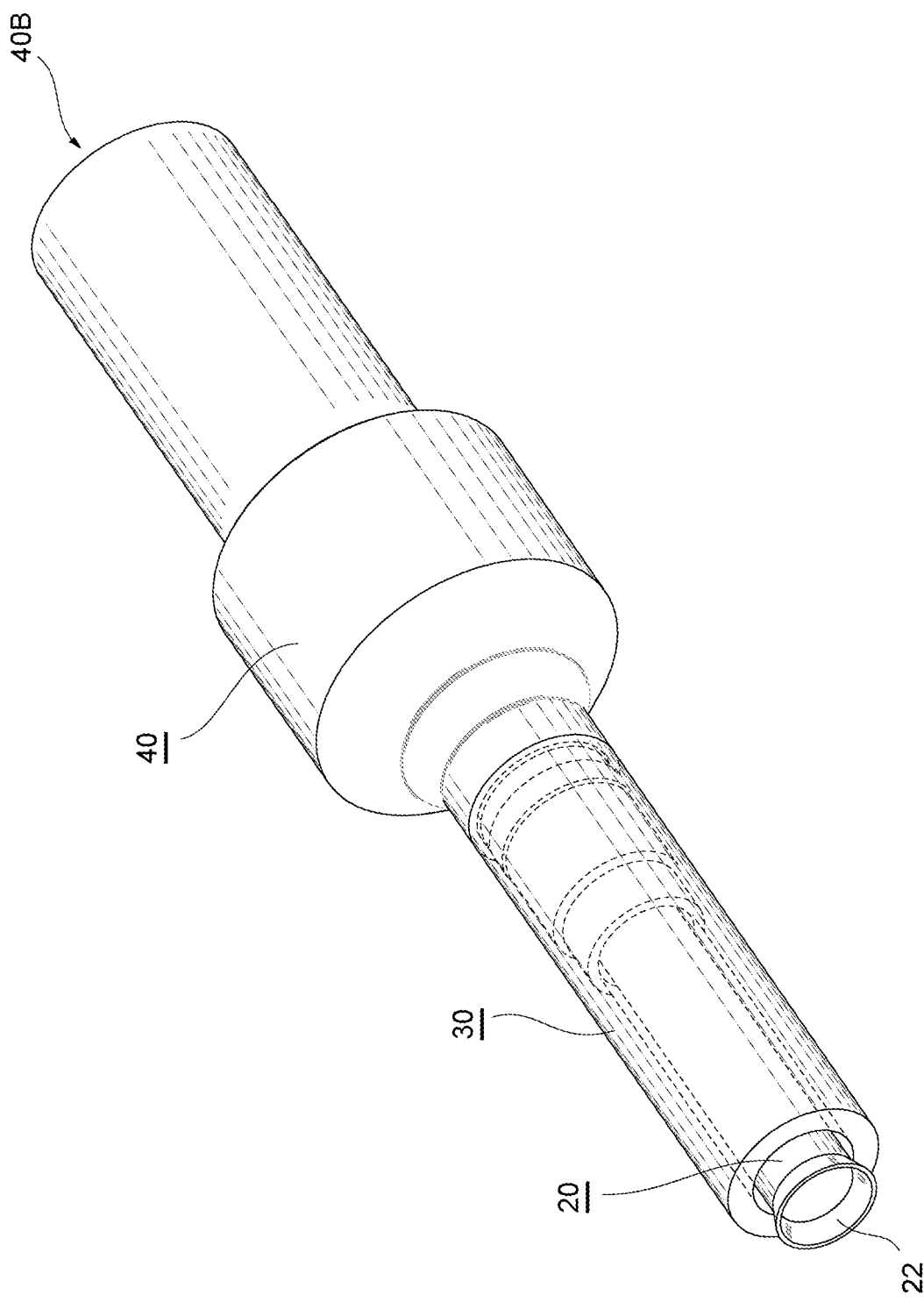
FIG. 6 is a perspective view illustrating a state in which an inner sleeve member, an outer sleeve member and a bush are assembled.
Figure 14:
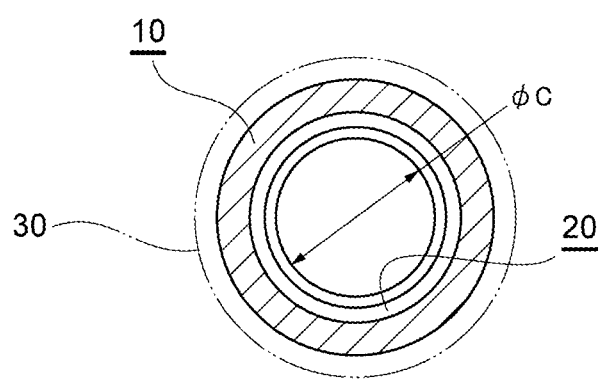
FIG. 14 is a cross-sectional view of a drilling tool taken along line XIV-XIV of FIG. 8.

Inserting the inner sleeve member 20 inside of the outer sleeve member 30, and embedding the base end 30B of the outer sleeve member 30 into the front end 40A of the bush 40 (see FIG. 6). Then, embedding the front end 20A of the inner sleeve member 20 into the base end 10B of the main body 10 (see FIGS. 7, 8 and 14, etc.). After that, mounting the body cover 50 at the outer periphery of the main body 10 (see FIGS. 9 and 10) to finish the assembling.

Figure 11:
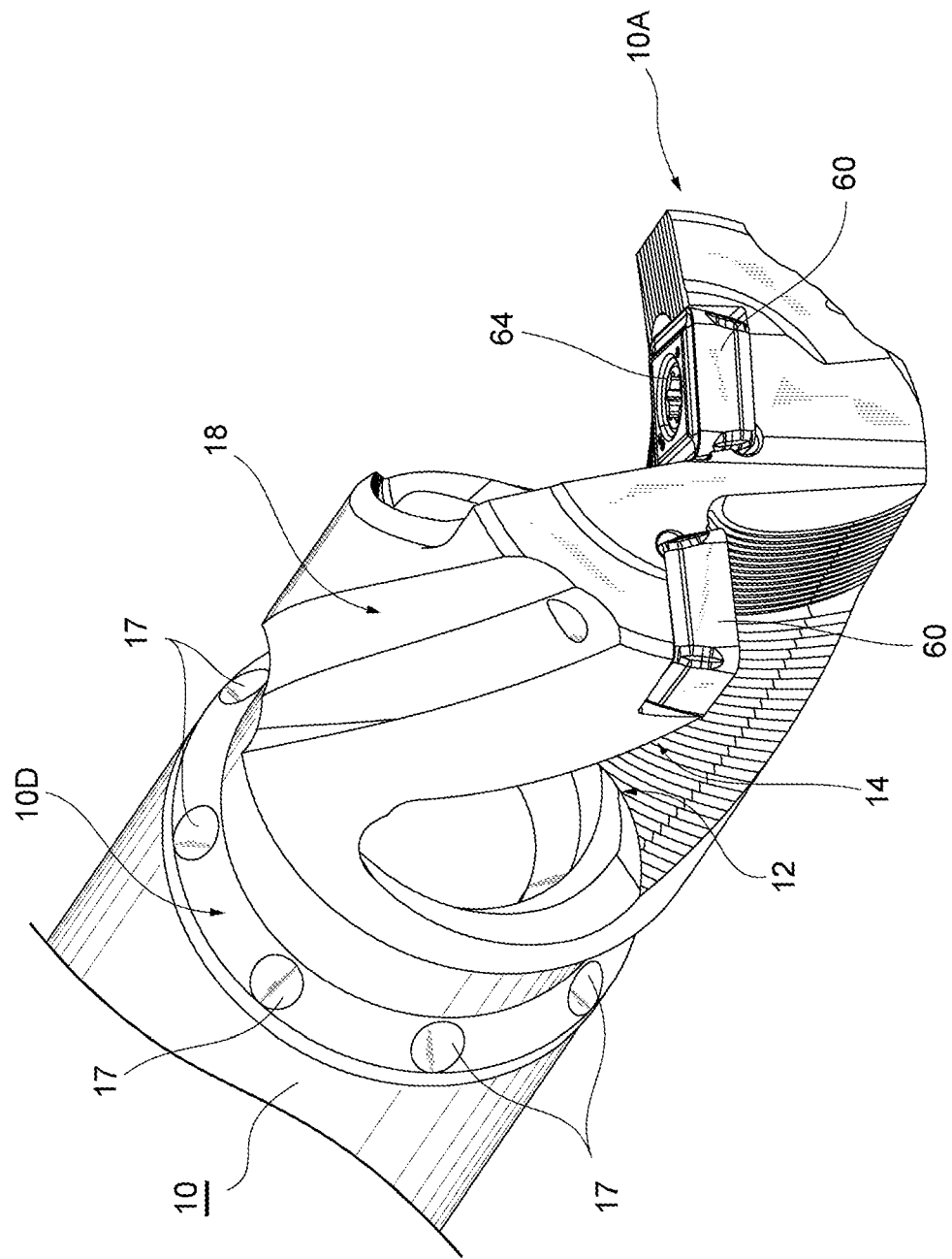
FIG. 11 is a perspective view of a structure near a front end portion of a drilling tool, viewed from another direction.
Figure 12:
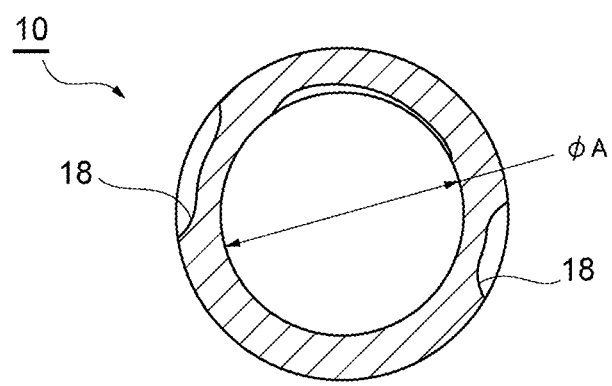
FIG. 12 is a cross-sectional view of a drilling tool taken along line XII-XII of FIG. 8.
Figure 15:
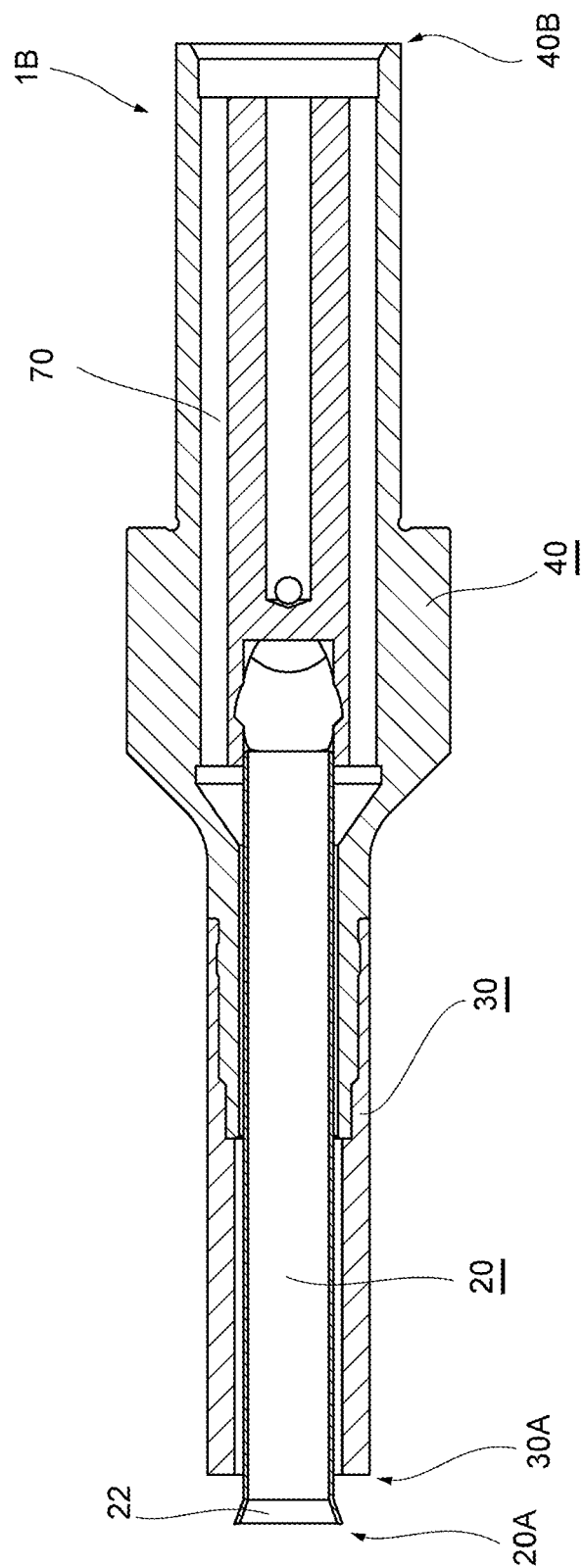
FIG. 15 is a longitudinal cross-sectional view illustrating a state in which an inner sleeve member, an outer sleeve member and a bush are assembled.

The cutting oil feed passage 70 of the assembled drilling tool 1 is briefly described below (see FIGS. 11 and 15, etc.).

The cutting oil fed from the base end 40B of the bush 40 may pass through the cutting oil feed passage 70 which is defined by the gap formed between the inner sleeve member 20 and the bush 40, pass through the cutting oil feed passage 70 which is cylindrical and is formed between the main body 10 and the inner sleeve member 20, and may be ejected through the ejection openings 17. Then, it may pass through the space around the reduced-diameter portion 10E and flow to the guiding groove 18, and then pass through the cutting oil feed passage 70 which includes the guiding groove 18. In this way, the cutting oil is fed to the front end portion 1A of the drilling tool 1.

In the drilling tool 1 of this embodiment, for example, due to the new discharge channel 12 differed from the conventional structure, a force is applied, in a spiral direction, to the cutting oil flowing to the base end portion 1B side. Hence, an pushing force is applied to facilitate the flow (spiral flow) of the cutting oil, thereby improving the performance of discharging the cutting oil and chip S during rotation (see FIG. 5). Even when such drilling tool 1 is used in an apparatus (i.e., the apparatus with poor discharging performance due to a small quantity of cutting oil. Generally speaking, special devices are usually designed to provide increased quantity of oil flow because the chips cannot be discharged efficiently during cutting when the quantity of oil flow is small) having a structure different from the structure using the BTA method in which the cutting is performed simultaneously with the feeding of a large quantity of cutting oil, the chips S can be sufficiently discharged simultaneously when the drilling process is performed. This means that it can also be applied to general equipment having a structure different from the structure using the BTA method. Thus, the application range is widened, and the equipment, including low cost equipment, can perform processing with high discharging performance.

In addition, due to the hollow main body 10 the inside of which is formed with the discharge channel 12, the drilling tool 1 of this embodiment, for example, can easily obtain high rigidity. That is, though a hollow member is lighter than a solid member, the hollow member can provide similar rigidity as the solid member of the same size. In another word, even from the viewpoint of lightweight design for the drilling tool 1, the main body 10 with the hollow structure is desired.

In addition, with respect to the so-called long drill for deep hole drilling, as a main body with a greater axial length is required, a longer chip pocket is required, and a portion of the main body to be cut is increased. In such case, there is a problem of lack of rigidity relative to the length of the main body. At this point, the drilling tool 1 of this embodiment which includes the hollow main body 10 as mentioned above can solve the problem of lack of rigidity relative to the length of the main body.

It should be noted that, all the above embodiments are merely preferred illustrative embodiments of the disclosure, but are not intended to limit the scope. Various modifications may be obtained without departing from the scope of the disclosure. For example, in the embodiment, the drilling tool 1 as described includes two cutting inserts 60 and two discharge channels 12 in one preferred embodiment. Otherwise, a plurality of (more than three) cutting inserts 60 may be provided, and the same number of discharge channels 12 may be provided, corresponding to respective cutting inserts 60, and formed to extend from the front end 10A to the base end 10B of the main body 10 and converge (connecting) with each other during extending from the front end portion 1A to the base end portion 1B.

In addition, in the above mentioned embodiments, the drilling tool 1 (see FIGS. 12-14), which comprises the flow path for discharging the chips S and the like with an inner diameter decreasing towards the base end portion 1B ($\varphi A > \varphi B > \varphi C$), is described for illustration. It is merely a preferred illustrative embodiment.

What is claimed is:

1. A drilling tool comprising:
a cutting insert, wherein the cutting insert has a cutting edge at a front end portion;
a main body, wherein the main body is mounted with the cutting insert;
a hollow discharge channel, wherein the hollow discharge channel is formed inside the main body, and
a curved surface formed in an inside surface of the discharge channel for guiding a chip in a direction towards a base end portion opposite to the front end portion, the curved surface extending rearward along a partial length of the discharge channel starting from immediately behind the cutting insert;
wherein the curved surface has a helical shape around the rotation axis of the drilling tool.

2. The drilling tool according to claim 1, wherein the hollow discharge channel is formed between a rotation axis of the drilling tool and the outer circumferential surface.

3. The drilling tool according to claim 1, wherein the curved surface is an inclined surface configured to apply an urging force on the chip in a direction towards the base end portion during rotation of the drilling tool.

4. The drilling tool according to claim 1, wherein the curved surface has a concaved shape in a cross section perpendicular to the rotation axis.

5. The drilling tool according to claim 1, wherein
the drilling tool is provided with a plurality of cutting inserts, and
a plurality of discharge channels being formed to extend from the front end portion to the base end portion and connecting with each other during extending, and
the number of the discharge channels are same as the number of the cutting insert.

6. The drilling tool according to claim 5, wherein the plurality of discharge channels are axisymmetrical about the rotation axis of the drilling tool as a center.

7. The drilling tool according to claim 1, wherein the drilling tool further comprises a supporting member, the supporting member is mounted on the base end portion of the main body and supports the main body, and is provided with a hollow flow channel in communication with the discharge channel of the main body.

8. The drilling tool according to claim 1, wherein the drilling tool further comprises a cutting oil feed passage for feeding cutting oil.

9. The drilling tool according to claim 8, wherein the cutting oil feed passage comprises a cutting oil feeding groove formed on a peripheral surface of the main body.

* * * * *